Sept. 15, 1959         W. NICLAS ET AL         2,904,099
       CONTROL MECHANISM FOR USE IN CONNECTION WITH
              MACHINES FOR MAKING CARCASSES
                   FOR PNEUMATIC TIRES
Filed Oct. 14, 1955                          2 Sheets-Sheet 1

INVENTORS:
WALTER NICLAS
RICHARD BECKADOLPH
BY

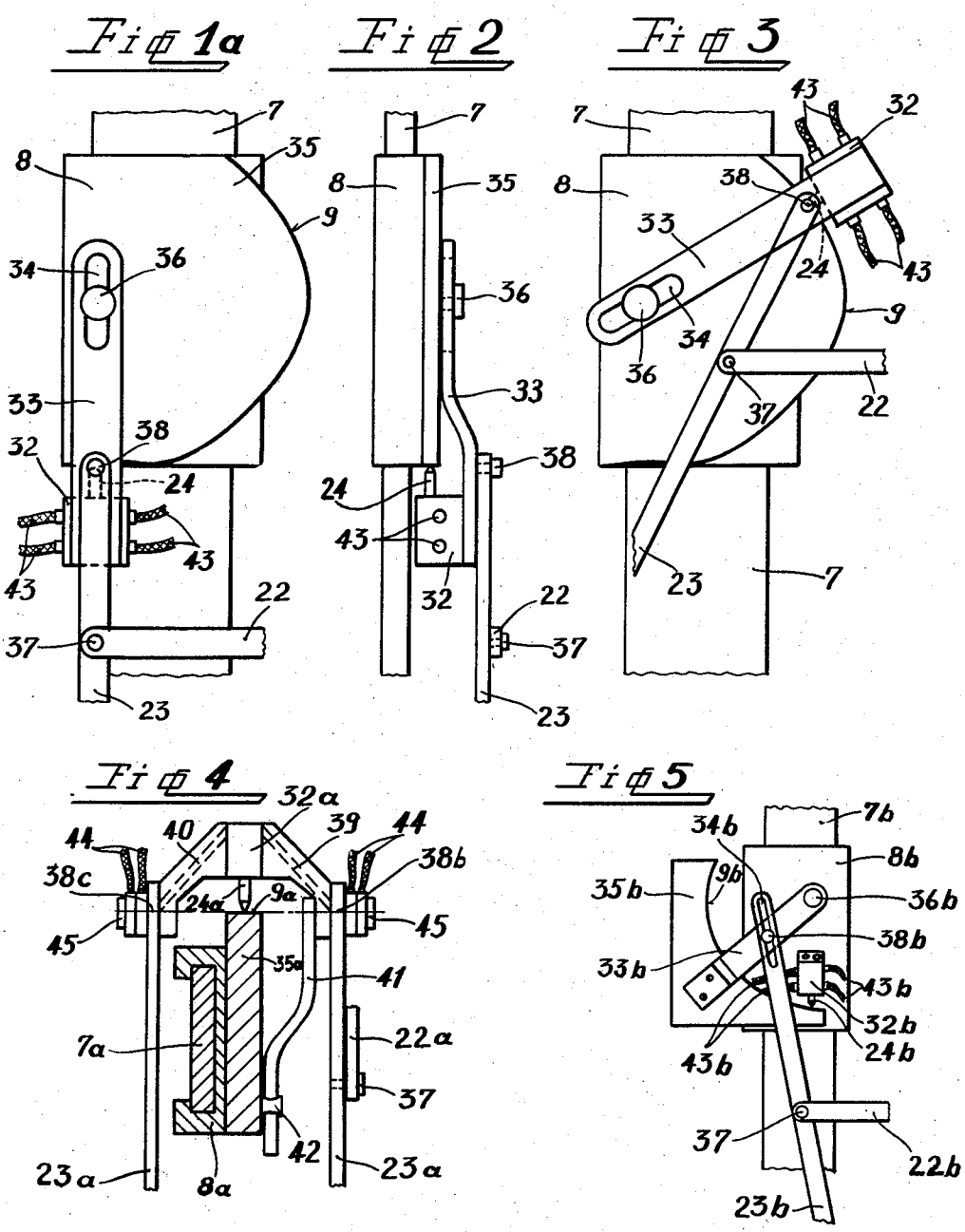

United States Patent Office 2,904,099
Patented Sept. 15, 1959

2,904,099

CONTROL MECHANISM FOR USE IN CONNECTION WITH MACHINES FOR MAKING CARCASSES FOR PNEUMATIC TIRES

Walter Niclas, Altwarmbuchen, Hannover, and Richard Beckadolph, Grasdorf, Hannover, Germany, assignors to Continental Gummi-Werke Aktiengesellschaft, Hannover, Germany Application October 14, 1955, Serial No. 540,601

Claims priority, application Germany October 15, 1954

9 Claims. (Cl. 154—9)

The present invention relates to a machine for making carcasses for pneumatic tires for vehicles in which the fabric layers supported by an annular body and forming the carcass are gripped at the marginal portions of said layers by grippers and are pulled under tension over the annular body. A machine of this type is disclosed in assignee's co-pending application Ser. No. 463,252, filed October 19, 1954. According to the said co-pending application, the movements required for pulling the said fabric layers over the annular body are controlled by means of a control cam and a hydraulic or similar feeler.

It is an object of the present invention to effect a further simplification of the control mechanism for controlling the movements necessary to bring about the pulling of the fabric layers over the annular body.

It is another object of this invention to provide a control mechanism for the above mentioned purpose, which will make it possible to enable a simple hydraulic or similar feeler to cooperate with various control cams.

These and other objects and advantages of the invention will appear more clearly from the following specification in connection with the accompanying drawings, in which:

Fig. 1a shows on a somewhat larger scale than that of Fig. 1 a front view of a control mechanism according to the invention, the control mechanism in Fig. 1a occupying its starting position.

Fig. 2 is a side view of the control mechanism shown in Fig. 1a.

Fig. 3 is a front view of the control mechanism of Fig. 1 while the undercut portion of the control surface is engaged by the feeler.

Fig. 4 shows a side view partly in section of a second embodiment of the present invention.

Fig. 5 represents a further modified embodiment of the invention.

*General arrangement*

Figure 1:
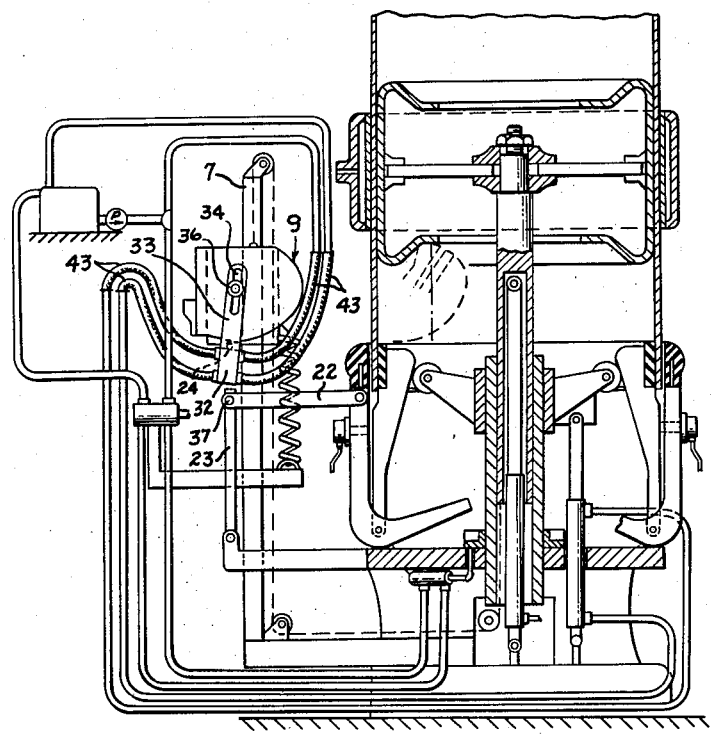
Fig. 1 illustrates a machine for making carcasses for pneumatic tires equipped with a first embodiment of a control mechanism according to the present invention.

The control mechanism according to the present invention is characterized primarily in that the feeler is journalled so as to be tiltable with regard to the cam surface in such a manner that the feeler will in all control positions be located perpendicularly or nearly perpendicularly on the cam surface. Such an arrangement brings about considerable advantages inasmuch as so-called two-component feelers are not necessary any longer which two-component feelers are relatively expensive due to their relatively complicated construction and due to said relatively complicated construction are more easily liable to disorders. Simple feelers equipped with feeler pistons journalled in the manner of push rods have heretofore proved unsatisfactory because for a proper operation of the machine, i.e. in order to bring about a pulling of the fabric layers over the annular body without any folds or creases, control cam surfaces have to be employed which are undercut in the direction of movement of the control cam surface. The journalling of the push rod according to the present invention makes it possible also to feel or sense the undercut portion of the control cam surface. This is due to the fact that the feeler with the straight line movement of the cam surface tilts relative to said cam surface in such a way that it will also approximately perpendicularly be located on the undercut portion of the control cam surface.

According to an embodiment which has proved highly successful in practice, the feeler is not only tiltable with regard to the cam surface but is also displaceable in the direction of the feeler. To this end, a bearing bolt or slide member is provided which is fixedly connected to a plate provided with the cam surface. The said bearing bolt or sliding member is so arranged with regard to the cam surface that its distance from all points of the cam surface will be approximately the same. Inasmuch as with geometrically complicated control cam surfaces no geometric center can be ascertained which has the same distance from all points of the control cam surface, such geometric center can be located only approximately. In order to compensate for the inaccuracies caused thereby, the above mentioned displaceable journalling of the feeler is employed for instance by connecting the casing for the feeler with a lever whose end adjacent said sliding member or bearing bolt is provided with an oblong hole or slot. Such an arrangement makes possible the desired tiltable and in the direction of the feeler displaceable journalling of the feeler.

A further simplification of the control mechanism is obtained by feeding the control fluid through the tiltable axle of the feeler by means of flexible hoses instead of directly into the feeler casing.

*Structural arrangement*

Referring now to the drawings in detail and Fig. 1 thereof in particular, the arrangement shown therein concerns a machine for making carcasses for pneumatic tires for vehicles. This machine corresponds substantially to that described in assignee's co-pending application Ser. No. 463,252, filed October 19, 1954. The arrangement of Fig. 1 differs from the machine in said co-pending application in the control mechanism which controls the means for tensioning the fabric layers and placing the same under tension on the annular body customary in such machines.

More specifically, there is provided a control member 8 which brings about the movements of the annular body supporting the fabric layers, while the control element proper in form of a control cam is designated with the reference numeral 9. The arrangement furthermore comprises a guiding member 7 for guiding the control member 8 and a hydraulic feeler 24 which by means of links 22 and 23 brings about the movement of the grippers for pulling the fabric layers over the annular body.

The hydraulic feeler 24 is housed in a casing 32 which latter is fixedly connected to a tiltable arm 33. That end of the arm 33 which is remote from the casing 32 is provided with an oblong hole or slot 34. The tiltable arm 33 and the casing 32 as well as the feeler 24 are tiltable relative to the control member 8 about a stud 36. This tilting movement is brought about by means of a plate 35 provided with the cam surface 9. The stud 36 is so located with regard to the cam surface 9 that when drawing straight lines from the stud 36 to the various points of the cam surface 9, such lines would have approximately uniform length, in other words the stud 36 should at least approximately form the geometrical center for the cam surface 9.

The links 22, 23 which bring about the movement of the gripping members are pivotally connected with each other at 37. In addition thereto, the upper end of link 23 (with regard to Fig. 1a) is by means of a bolt 38 pivotally connected with the arm 33 of the feeler casing 32.

According to Fig. 2, the pivot point 38 of the link 23 with the tiltable arm 33 is so selected that the tip of the feeler 24 is located on the extension of the axis of the bolt 38. It is expedient so to arrange the links 22 and 23 and to design the extension of the link 23 in such a way that the pivot bolt 38 and the tip of the feeler 24 carry out the movements which are also carried out by the tips of the gripper members so that the movement of the gripper members precisely corresponds to the curved shape or contour of the cam surface 9.

As will be evident from Figs. 1a and 3, the feeler 24, due to its tiltability about bolt 36, will always be perpendicular or nearly perpendicular to the cam surface 9. Consequently a simple feeler 24 movable along a straight line will suffice to feel or sense the undercut cam surface 9. The displacement of the tiltable arm 33 in longitudinal direction which is necessary during the working process and caused by the geometric shape of the cam surface is made possible by the slot 34.

While according to the embodiment shown in Figs. 1a to 3 one tiltable arm 33 only is employed for supporting the feeler 24, according to Fig. 4 a bilateral journalling of the feeler 24a and its casing 32a is obtained. Furthermore, two links 23a are employed which at 38b, 38c are pivotally connected to the supporting members 39 and 40 of the casing 32 similar to the pivot point 38 of the arrangement shown in Figs. 1a to 3. The tiltable journalling of the feeler 24a with regard to the cam surface 9a is obtained by means of a guiding rod 41 which slidably engages a bore of a slide member 42 slidably mounted on the plate 35a which is provided with the cam surface 9a. For purposes of connecting the feeding lines 44 for the hydraulic feeler, which feeding lines correspond to the feeding lines 43 of the embodiment of Figs. 1a to 3, the feeding lines 44 are directly connected to the pivot bolts 45 of the supporting members 39, 40. The other parts of the arrangement shown in Fig. 4 and corresponding to those of the embodiment of Figs. 1a to 3 are designated with the same reference numerals as they occur in the embodiment of Figs. 1 to 3 but with the additional character a. It is understood that, if desired, according to Fig. 5 the plate 35, 35a with the cam surface 9, 9a may be journalled so as to be tiltable with regard to the feeler, while the feeler carries out a straight line movement only. Such an arrangement is shown in Fig. 5, in which all parts corresponding to those of Fig. 4 are designated with the same reference numerals as in Fig. 4 but with the additional character b instead of a. It should furthermore also be noted that the invention is also applicable in connection with such machines in which the annular body for receiving the fabric layers is non-displaceably mounted and in which the movements for pulling the fabric layers over the annular body are carried out exclusively by the grippers.

It is, of course, understood that the present invention is, by no means, limited to the particular construction shown in the drawings but also comprises any modifications within the scope of the appended claims.

What we claim is:

1. In a tire building machine comprising gripper means for pulling around an annular member fabric layers forming part of the tire being built a control system for controlling the movement of said gripper means said control system comprising: a first control element having a cam surface, a second control element including feeler means arranged to move along and sense said cam surface, first lever means fixedly connected to said second control element and pivotally connected to said first control element, second lever means pivotally connected to said first lever means, and third lever means pivotally connected to said second lever means operatively connected to said gripper means, said feeler means and said cam surface being tiltably arranged relative to each other so that the longitudinal axis of said feeler means will in all control positions thereof be at least approximately perpendicular to the respective cam surface section adjacent thereto.

2. In a tire building machine comprising gripper means for pulling around an annular member fabric layers forming part of the tire being built, a control system for controlling the movement of said gripper means said control system comprising: a first control element having a cam surface, a second control element including a feeler arranged to move along and sense said cam surface, one of said control elements being tiltable relative to the other control element and being movable in the longitudinal direction of said feeler, first lever means fixedly connected to said second control element and pivotally connected to said first control element, second lever means pivotally connected to said first lever means, and third lever means pivotally connected to said second lever means and operatively connected with said gripper means, said feeler and said cam surface being tiltably arranged relative to each other so that the longitudinal axis of said feeler will in all control positions thereof be at least approximately perpendicular to the respective cam surface section adjacent thereto.

3. In a tire building machine comprising gripper means for pulling around an annular member fabric layers forming part of the tire being built a control system for controlling the movement of said gripper means said control system comprising: a first control element having a cam surface, a second control element including a feeler arranged to move along and sense said cam surface, first lever means fixedly connected to said second control element and pivotally connected to said first control element, second lever means pivotally connected to said first lever means, and third lever means pivotally connected to said second lever means and operatively connected with said gripper means, said feeler and said cam surface being tiltably arranged relative to each other so that the longitudinal axis of said feeler will in all control positions thereof be at least approximately perpendicular to the respective cam surface section adjacent thereto, the tip of said feeler being arranged along the extension of the axis of the pivotal connection of said second lever means with said first lever means.

4. In a tire building machine comprising gripper means for pulling around an annular member fabric layers forming part of the tire being built, a control system for controlling the movement of said gripper means said control system comprising: a first control element having a cam surface, a second control element including a feeler arranged to move along and sense said cam surface, fluid operable means associated with said feeler for holding the same in contact with said cam surface, first lever means fixedly connected to said second control element and pivotally connected to said first control element, second lever means pivotally connected to said first lever means, conduit means communicating with said fluid operable means and extending through the pivotal connection of said second lever means with said second control element, and third lever means pivotally connected to said lever means and operatively connected to said gripper means, said feeler and said cam surface being tiltably arranged relative to each other so that the longitudinal axis of said feeler will in all control positions thereof be at least approximately perpendicular to the respective cam surface section adjacent thereto.

5. In combination in a control system for controlling a movable member: a first control element having a cam surface, a second control element including a feeler arranged to move along and sense said cam surface, first lever means fixedly connected to said second control element and pivotally connected to said first control element, second lever means pivotally connected to said first lever means, and third lever means pivotally connected to said second lever means and operatively connected to said movable member, said feeler and said cam surface being tiltably arranged relative to each other so that the longitudinal axis of said feeler will in all control positions thereof be at least approximately perpendicular to the respective cam surface section adjacent thereto.

6. In combination in a control system for controlling a movable member: a first control element having a cam surface, a second control element including a feeler arranged to move along and sense said cam surface, one of said control elements being tiltable relative to the other control element and being movable in the longitudinal direction of said feeler, first lever means fixedly connected to said second control element and pivotally connected to said first control element, second lever means pivotally connected to said first lever means, and third lever means pivotally connected to said second lever means and operatively connected with said movable member, said feeler and said cam surface being tiltably arranged relative to each other so that the longitudinal axis of said feeler will in all control positions thereof be at least approximately perpendicular to the respective cam surface section adjacent thereto.

7. In combination in a control system for controlling a movable member: a first control element having a cam surface, a second control element including a feeler arranged to move along and sense said cam surface, first lever means fixedly connected to said second control element and pivotally connected to said first control element, second lever means pivotally connected to said first lever means, and third lever means pivotally connected to said second lever means and operatively connected with said movable member, said feeler and said cam surface being tiltably arranged relative to each other so that the longitudinal axis of said feeler will in all control positions thereof be at least approximately perpendicular to the respective cam surface section adjacent thereto, the tip of said feeler being arranged along the extension of the axis of the pivotal connection of said second lever means with said first lever means.

8. In combination in a control system for controlling a movable member: a first control element having a cam surface, a second control element including a feeler arranged to move along and sense said cam surface, fluid operable means associated with said feeler for holding the same in contact with said cam surface, first lever means fixedly connected to said second control element and pivotally connected to said first control element, second lever means pivotally connected to said first lever means, conduit means communicating with said fluid operable means and extending through the pivotal connection of said second lever means with said second control element, and third lever means pivotally connected to said second lever means and operatively connected to said movable member, said feeler and said cam surface being tiltably arranged relative to each other so that the longitudinal axis of said feeler will in all control positions thereof be at least approximately perpendicular to the respective cam surface section adjacent thereto.

9. In combination in a control system for controlling movable means: a first control element including a cam surface, a second control element including a feeler arranged to move along and sense said cam surface, one of said control elements being movable along a straight path and the other one of said control elements being tiltable relative to said one control element, fluid operable means controlling the movement of said movable means, link means connecting said movable means to said other one of said control elements, and fluid conveying means controlled by said feeler and leading to said fluid operable means.

References Cited in the file of this patent
UNITED STATES PATENTS

| | | |
|---|---|---|
| 1,928,015 | Grow | Sept. 26, 1933 |
| 2,503,815 | Frohlich | Apr. 11, 1950 |
| 2,555,343 | Jones | June 5, 1951 |
| 2,623,285 | Marinovich | Dec. 30, 1952 |
| 2,742,823 | Compton | Apr. 24, 1956 |